May 25, 1965     C. A. GREGORY, JR., ET AL     3,186,003

VARIABLE SHUTTER MECHANISM

Filed Dec. 1, 1961

INVENTORS
Charles A. Gregory, Jr. &
James C. Mills, Jr.

BY *Beale and Jones*

ATTORNEYS

:::::
United States Patent Office 3,186,003
Patented May 25, 1965

---

3,186,003
VARIABLE SHUTTER MECHANISM
Charles A. Gregory, Jr., and James C. Mills, Jr., Richmond, Va., assignors to Flight Research, Incorporated, Richmond, Va., a corporation of Virginia
Filed Dec. 1, 1961, Ser. No. 156,453
11 Claims. (Cl. 352—208)

This invention provides a mechanism for adjusting the relative angular position of two coaxial members while they are in rotary motion about their common axis. It has particular application as an adjustment for the shutter aperture in a motion picture camera having a rotary focal plane shutter.

In a common type of motion picture camera, two overlying shutter blades are mounted for rotation upon coaxial shafts, with both shafts being driven at the same angular rate. The registry of two cutout portions, one in each of the two overlying blades, provides the camera shutter aperture, and a mechanism is preferably provided which will permit the adjustment of the shutter aperture by adjusting the relative angular position of the two shafts while the shafts and the blades which they carry are in rotary motion.

Gear train mechanisms for accomplishing this angular adjustment during rotary motion are known. At higher camera speeds, however, with the consequent higher angular velocity of the shutter blades, the inertia of shutter adjusting mechanisms composed solely of gears becomes a detrimental factor, affecting unfavorably the rate with which either the angular velocity of the blades or the angular position of the blades may be changed.

It is the object of this invention to provide such a mechanism having low inertia.

The mechanism of this invention achieves low inertia by using as its principal driving elements, instead of gears, two endless flexible loops, which are preferably lightweight belts. Each of two coaxial rotary members is connected by a separate loop in a driving, non-slip manner to a third rotary member whose axis is spaced from that of the coaxial members. This combination of three rotary members and two connecting loops may be driven at any point, causing the two coaxial members to rotate. One or both of these loops is longer than it needs to be just to connect the two rotary members, and what would be the slack is taken up by engagement with a loop shifting means. This loop shifting means does not interfere with the normal drive of the system, but when it is desired to alter the relative angular positions of the coaxial members, the loop shifting means is moved, pulling or shifting one or both of the loops from one side to the other. In the loop or loops thus shifted, the portions of the loop contacting its corresponding rotary members are changed. This changes the relative angular positions of the two rotary members which the loop connects, and results in a shift in the relative angular positions of the two coaxial members.

The operation of this invention may be more clearly understood from the following detailed description of one embodiment of the mechanism as a control for the shutter aperture in a motion picture camera. The description is to be taken in connection with the drawings, in which.

Figure 1:
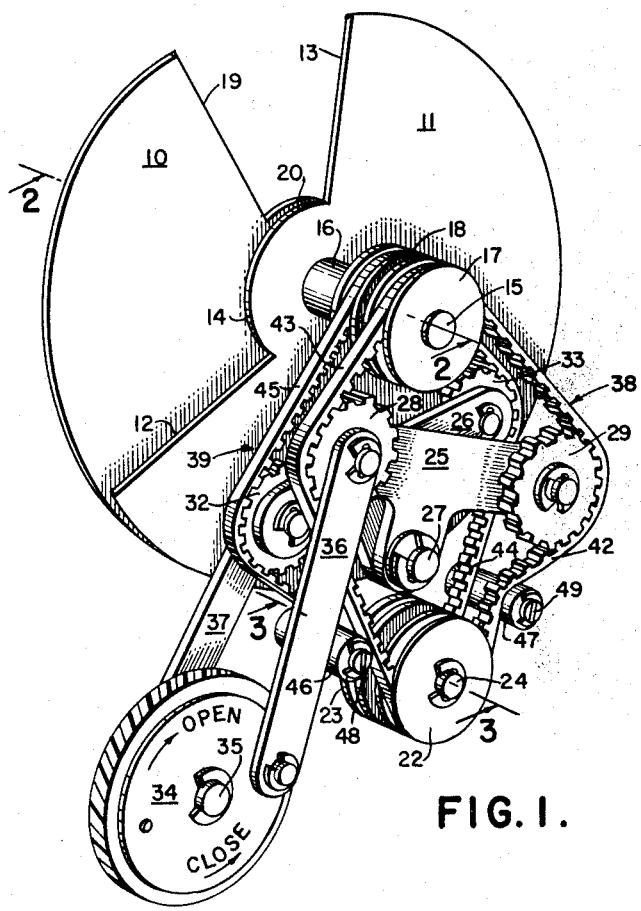
FIGURE 1 is a perspective of the shutter aperture adjust mechanism.

Referring now to FIG. 1, two circular blades 10 and 11 are arranged in overlying relationship. Blade 11 has a cutout portion defined by radial edges 12 and 13, and arcuate "bottom" edge 14. Blade 10 has a similar cutout portion, only one radial edge 19 and a portion of arcuate edge 20 being visible in the drawing. The width of the shutter aperture, defined by radial edge 13 of blade 11, radial edge 19 of blade 10, and the arcuate edges, which are of equal radius, is governed by the degree of registry of the two cutout portions of blades 10 and 11, and therefore by the relative angular positions of the blades.

Figures 2, 3:
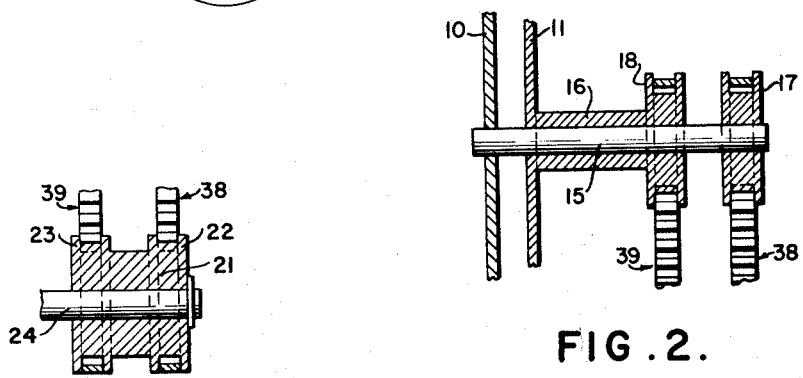
FIGURE 2 is a section taken along line 2—2 of FIGURE 1.
FIGURE 3 is a section taken along line 3—3 of FIGURE 1.

Referring to FIG. 2, shutter blade 10 is attached to shaft 15, and shutter blade 11 to hollow shaft 16, which surrounds and is coaxial with shaft 15. Shaft 15 has a sprocket 17 attached to it, and shaft 16 has attached to it a similar sprocket 18.

Refer now to FIG. 3. A drum 21, carrying two sprocket sections 22 and 23 which are aligned with sprockets 17 and 18 respectively, is mounted for free rotation about shaft 24, which is parallel to the axis of shafts 15 and 16.

Two T-shaped brackets 25 and 26 (FIG. 1) are pivotally mounted near the bottom of their depending portions to shaft 27, which is parallel to the axis of shafts 15 and 16. Two idler sprockets 28 and 29 are mounted for free rotation at the opposite ends of the cross portion of T-shaped bracket 25, and idler sprockets 32 and 33 are similarly mounted upon bracket 26. Idler sprockets 28 and 29 are aligned with sprocket 17, and idler sprockets 32 and 33 with sprocket 18.

Gear 34 is mounted for rotation about a shaft 35 which is parallel to the axis of shafts 15 and 16. Connecting rods 36 and 37 are each pivotally connected at one end to gear 34, on opposite sides of gear 34 and near opposite ends of a diameter. The other ends of connecting rods 36 and 37 are pivotally attached to one end of the cross portion of T-shaped brackets 25 and 26 respectively, at the same points where idler sprockets 28 and 32, respectively, are attached.

An endless loop 38 of flexible toothed belt passes around and engages sprocket 17, idler sprockets 28 and 29, and sprocket section 22 of drum 21. Another endless loop 39 of toothed belt similarly engages sprocket 18, idler sprockets 32 and 33, and sprocket section 23 of drum 21.

In operation, rotary motion is imparted to shaft 15 by any convenient and standard drive from the camera; neither the camera structure nor the type of shutter drive is shown, since neither forms a part of this invention.

Shaft 15 turns shutter blade 10, which is connected rigidly to it. The rotary drive for shaft 16, and shutter blade 11 which is mounted on it, is taken from shaft 15 via sprocket 17, transmitted to drum 21 via belt 38 and sprocket section 23, and transmitted to shaft 16 via belt 39 and sprocket 18.

Shafts 15 and 16, and shutter blades 10 and 11 mounted thereon, must turn at an identical angular rate, and this is accomplished in this embodiment by making both belts, and the corresponding sprockets over which the belts pass, identical in size. While this is a convenient way of providing identical angular velocity of the two shutter blades, it is of course possible to use a similar mechanism having corresponding parts of differing size, as long as the elements are so proportioned that the result is the same.

In describing the action of the mechanism in altering the relative angular positions of shutter blades 10 and 11, it is convenient to consider each of the belts as having two generally opposed portions, or runs. Thus, as viewed in FIG. 1, one run 42 of belt 38 comprises that portion of the belt extending from the right side of sprocket 17, passing around idler sprocket 29, and extending down to the right side of sprocket portion 22 of drum 21. The other run 43 of belt 38 extends from the left sides of sprocket 17 and sprocket portion 22 of drum 21 and passes around idler sprocket 28. Belt 39 has corresponding right and left hand runs 44 and 45 respectively.

In operation, with shutter blades 10 and 11 rotating, but with the shutter aperture remaining fixed, gear 34 does not rotate but is held stationary, and connecting rods 36 and 37 hold T-shaped brackets 25 and 26 respectively in fixed positions. Belts 38 and 39 run freely over idler sprockets 28, 29, 32 and 33. Thus, the loop shifting means, comprising T-shaped brackets 25 and 26 and their associated idler sprockets, does not affect the drive of the shutter blades in normal operation.

To open the shutter aperture, gear 34 is rotated in a clockwise direction. This causes connecting rods 36 and 37 to rotate T-shaped brackets 25 and 26 counterclockwise and clockwise respectively about their pivot points on shaft 27. The counterclockwise rotation of bracket 25 causes belt 38 to be pulled to the left, lengthening run 43 and shortening run 42. This alters the relative angular position of sprocket section 22, and drum 21 of which it is a part, with respect to sprocket 17, resulting in turning drum 21 clockwise with respect to sprocket 17. The clockwise rotation of bracket 26 causes belt 39 to be pulled to the right, lengthening run 44 and shortening run 45. This alters the relative angular position of sprocket 18 with respect to drum 21, turning sprocket 18 clockwise with respect to drum 21.

The two clockwise shifts described above are cumulative, and shaft 16 will be rotated clockwise with respect to shaft 15, and consequently shutter blade 11 will be rotated clockwise with respect to blade 10, an angular distance equal to the sum of the two shifts.

This cumulative effect may be seen more clearly by assuming for a moment that bracket 26 does not turn, but remains fixed. Then the clockwise shift of drum 21 with respect to sprocket 17, described above, will be transmitted via belt 39 to sprocket 18 and shaft 16, and shaft 16 will be turned relative to shaft 15 through a clockwise angle equal to the relative angle of shift of drum 21 with respect to shaft 15. If we assume that bracket 26 is now rotated, sprocket 18 will be rotated through an additional clockwise angle with respect to drum 21, and consequently with respect to sprocket 17 and shaft 15. Consequently, when brackets 25 and 26 are both rotated the shutter aperture is opened an additional angular increment equal to the sum of the angle of rotation of drum 21 relative to sprocket 17 and the angle of rotation of sprocket 18 relative to drum 21.

Counterclockwise rotation of gear 34 tends to close the shutter aperture in an analogous manner.

Studs 46 and 47 are provided to take up the slack which would otherwise appear in belts 38 and 39 as they are pulled into different positions in changing the shutter aperture. Studs 46 and 47 are mounted eccentrically and are provided with screwdriver slots 48 and 49 respectively to permit adjustment toward or away from the belts.

It is understood of course, that the mechanism of this invention is not restricted to the particular embodiment which is described in detail above, but is suitable for use wherever it is necessary to adjust the relative angular positions of two rotating coaxial members while they are in rotary motion. Various modifications of the mechanism, corresponding to the conditions of its application, will suggest themselves to those skilled in the art. Such modifications, some of which are mentioned below, are within the contemplation of this invention.

Belts 38 and 39 are preferably made of fiberglass. However, other materials would be suitable for the belts, with the flexibility, toughness, and other characteristics of the material being determined in each case by the particular application. It is also possible to use any other type of endless flexible loops, such as chains, in lieu of the belts; although belts provide ideal low inertia components in an application such as this where high operating speeds are used and rapid starting and stopping are required.

It is not necessary to the invention that shaft 15 be driven, as shown in this embodiment; the mechanism would function in an identical manner if hollow shaft 16, which surrounds and is coaxial with shaft 15, were driven, or if drum 21 were driven and in turn drove shafts 15 and 16. In fact, the primary drive system, comprising the three rotary members and the two flexible endless loops, may be driven at any point.

The purpose of the loop shifting means is to alter the angular relation of the coaxial rotary members by pulling the flexible endless loops from one side to the other. It is possible to use other configurations of this loop shifting means than T-shaped pivoted brackets with attached idler sprockets, as in the described embodiment. Each loop, in order that it may be shifted or pulled from side to side, must be longer than is required merely to drive the two rotary members, and the loop shifting means must engage such shiftable loop so as to take up the slack which would otherwise be caused by its extra length. The engagement of the loop shifting means with a loop must be such as not to impede the normal driving motion of the loop, i.e. must have a relatively low frictional drag on the loop. In order that the loop be shiftable in either direction, the loop shifting means must engage both runs of the loop. The loop shifting means must, of course, be mounted so that it moves in a direction and through a distance sufficient to pull the loop as required. Any configuration of loop shifting means satisfying these requirements may be used.

The loop shifting means may engage and shift only one of the two loops, instead of both as in the embodiment described above. This will be apparent from the description given above of the operation of the mechanism. The shifting of each T-shaped bracket with its two attached idler sprockets provides in and of itself a certain amount of angular shift of one coaxial rotary member with respect to the other; while the shifting of both endless flexible loops is twice as efficient, the mechanism will work if only one is shifted.

The drive for gear 34, which controls the positions of the T-shaped brackets and idlers through connecting rods 36 and 37, may be provided by any suitable means, such as a servo motor. This drive is not shown and forms no part of this invention. While the gear and connecting rod arrangement described and shown in this embodiment is a convenient one for controlling the position of T-shaped brackets 25 and 26, any other convenient means may be used.

This invention is not restricted to the adjustment of the aperture of a rotary type camera shutter, but may be used wherever it is desired to alter the angular relationship of two coaxial rotating members.

Where used, as in the embodiment described herein, as an adjustment for the rotary shutter of a camera, the mechanism will be so proportioned that the two rotary shafts carrying the shutter blades rotate with identical angular velocities, as described above. However, it is contemplated that in other applications it may be desirable to have the two coaxial members (they need not be shafts) rotating at differing angular velocities, having a fixed ratio, and the invention may be adapted, by suitable arrangement of the size of the components, to provide any desired ratio of angular velocities. The relative angular positions of the two coaxial members would, in such a case, vary at a constant rate, and the adjustment provided by this invention would operate to alter in either direction the relative angular positions of the coaxial members resulting from the constant drive ratio.

It will be seen from the above description that this invention provides a convenient, low-inertia mechanism for adjusting the relative angular positions of two rotating coaxial members.

We claim:

1. A mechanism having low inertia at high speeds for varying the angular relationship between two coaxial rotary members while rotating at high speeds, comprising:

first and second coaxial rotary members mounted for rotation about their common axis;

a third rotary member mounted for rotation about an axis spaced from the axis of said first and second rotary members;

first and second endless flexible loops, said first loop passing around said first and third rotary members and connecting said first and third rotary members in a non-slip, driving manner, said second loop passing around said second and third rotary members and connecting said second and third rotary members in a non-slip, driving manner;

means to drive the combination of said three rotary members and said loops, whereby all of said three rotary members are caused to rotate;

each of said loops having two generally opposed runs extending between the two rotary members which it connects;

at least one of said loops being longer than would be required merely to connect the two rotary members around which it passes;

loop shifting means engaging both runs of said longer loop so as to take up the slack which would otherwise exist in said longer loop;

means to impart to said loop shifting means a motion having a component in a direction perpendicular to a line connecting the axis of said first and second coaxial rotary members and the axis of said third rotary member, whereby the position of said longer loop engaged by said loop shifting means is shifted so that the relative lengths of its two runs are altered, the relative angular positions of the two rotary members which said longer loop connects are altered, and consequently the relative angular positions of said first and second coaxial rotary members are altered.

2. The mechanism of claim 1 wherein said loop shifting means includes idler wheel means, said idler wheel means engaging said runs of said longer loop.

3. The mechanism of claim 1 wherein said loop shifting means comprises:

two idler wheels, each of said wheels engaging a separate run;

a pivotally mounted bracket, upon which each of said wheels is mounted for free rotation.

4. The mechanism of claim 1 wherein said endless flexible loops comprise toothed belts.

5. The mechanism of claim 1 wherein said endless flexible loops are made of fiberglass.

6. The mechanism of claim 1 wherein both of said loops are longer than would be required merely to connect the two rotary members around which they pass and said loop shifting means comprises two loop shifting structures, each of said structures being adapted to engage and shift a separate one of said loops.

7. The mechanism of claim 6 wherein each of said loop shifting structures comprises two idler wheels, each of said wheels engaging a separate run of its corresponding loop;

a pivotally mounted bracket, upon which each of said wheels is mounted for free rotation.

8. The mechanism of claim 6 wherein said means to impart motion to said loop shifting means comprises:

a wheel, mounted for rotation about an axis spaced from the axes of said rotary members;

two connecting rods, one end of each said rod being pivotally connected to a separate one of said loop shifting structures, the other ends of said rods being pivotally connected at spaced points to said wheels; so that upon rotation of said wheel said two loop shifting structures are caused to move in opposite directions, resulting in each of said loops being shifted in a sense opposite to the shift of the other of said loops.

9. In a motion picture camera in which the shutter aperture is defined by the degree of registration of the cutout portions of two overlying, rotating shutter blades, a mechanism for adjusting the shutter aperture while the shutter blades are rotating, comprising:

first and second shutter blades having cutout portions and mounted for rotation in overlying relation upon first and second coaxial rotary members, respectively;

a third rotary member mounted for rotation about an axis spaced from the axis of said first and second rotary members;

first and second endless flexible loops, said first loop passing around said first and third rotary members and connecting said first and third rotary members in a non-slip, driving manner, said second loop passing around said second and third rotary members and connecting said second and third rotary members in a non-slip, driving manner;

means to drive the combination of said three rotary members and said loops, whereby said shutter blades are caused to rotate;

each of said loops having two generally opposed runs extending between the two rotary members which it connects;

at least one of said loops being longer than would be required merely to connect the two rotary members around which it passes;

loop shifting means engaging both runs of said longer loop so as to take up the slack which would otherwise exist in said longer loop;

means to impart to said loop shifting means a motion having a component in a direction perpendicular to a line connecting the axis of said first and second coaxial rotary members and the axis of said third rotary member whereby the position of said longer loop engaged by said loop shifting means is shifted so that the relative lengths of its two runs are altered, the relative angular positions of the two rotary members which said longer loop connects are altered, and consequently the relative angular positions of said first and second shutter blades are altered.

10. The mechanism of claim 9 wherein both of said lops are longer than would be required merely to connect with two rotary members around which they pass and said loop shifting means comprises two loop shifting structures, each of said structures being adapted to engage and shift a separate one of said loops.

11. A low-inertia mechanism for varying the angular relationship between two coaxial rotary members, comprising:

first and second coaxial rotary members mounted for rotation about a first axis;

a third rotary member mounted for rotation about a second axis spaced from said first axis;

first and second endless flexible loops, said first loop passing around and connecting said first and third rotary members in a non-slip, driving manner, said second loop passing around and connecting said second and third rotary members in a non-slip, driving manner;

means to drive the combination of said three rotary members and said first and second loops for high-speed rotation and rapid starting and stopping, whereby all of said three rotary members are caused to rotate;

each of said loops having two generally opposed runs extending between the two rotary members which it connects;

at least one of said loops being longer than would be required merely to connect the two rotary members around which it passes;

loop shifting means engaging both runs of said longer loop so as to take up the slack which would otherwise exist in the loop;

means to impart to said loop shifting means a motion having a component in a direction perpendicular to a line connecting said first and second axes, whereby the position of said longer loop engaged by said loop shifting means is shifted so that the relative lengths of its two runs are altered, the relative angular positions of the two rotary members which said longer loop connects are altered, and consequently the relative angular positions of said first and second coaxial rotary members are altered.

References Cited in the file of this patent
UNITED STATES PATENTS

| | | |
|---|---|---|
| 1,173,706 | Carleton | Feb. 29, 1916 |
| 2,212,348 | Ludington | Aug. 20, 1940 |
| 2,352,797 | Miller | July 4, 1944 |